(12) United States Patent
Decius et al.

(10) Patent No.: US 11,872,996 B2
(45) Date of Patent: Jan. 16, 2024

(54) CONTROL SYSTEM FOR A MOTOR VEHICLE AND METHOD FOR DIAGNOSING A FAILURE IN A CONTROL SYSTEM

(71) Applicant: HELLA GmbH & Co. KGaA, Lippstadt (DE)

(72) Inventors: Nikolaus Decius, Lippstadt (DE); Julian Eckstein, Herten (DE); Sergey Orlov, Paderborn (DE); Peter Grabs, Wuerzburg (DE); Matthias Korte, Wuerzburg (DE); Pascal Vollmer, Karlsruhe (DE); Heiko Lerch, Ruelzheim (DE); Michael Claus, Schwalmstadt-Roershain (DE); Fridolin Bauer, Garching (DE); Juergen Gebert, Moosburg (DE); Florian Oszwald, Munich (DE)

(73) Assignee: Hella GmbH & CO. KGaA, Lippstadt (DE)

( * ) Notice: Subject to any disclaimer, the term of this patent is extended or adjusted under 35 U.S.C. 154(b) by 348 days.

(21) Appl. No.: 17/170,400

(22) Filed: Feb. 8, 2021

(65) Prior Publication Data

US 2021/0163023 A1 Jun. 3, 2021

Related U.S. Application Data

(63) Continuation of application No. PCT/EP2019/070472, filed on Jul. 30, 2019.

(30) Foreign Application Priority Data

Aug. 7, 2018 (DE) ...................... 10 2018 213 182.1

(51) Int. Cl.
*B60W 50/02* (2012.01)
*B60W 30/18* (2012.01)
(Continued)

(52) U.S. Cl.
CPC ...... *B60W 50/0205* (2013.01); *B60W 30/188* (2013.01); *B60W 50/029* (2013.01);
(Continued)

(58) Field of Classification Search
CPC ........... B60W 50/0205; B60W 30/188; B60W 50/029; B60W 2050/021; B60W 2050/0292
See application file for complete search history.

(56) References Cited

U.S. PATENT DOCUMENTS 6,804,564 B2 10/2004 Crispin et al.
9,434,330 B2 9/2016 Lee
(Continued)

FOREIGN PATENT DOCUMENTS

CN 102189995 A 9/2011
CN 104553835 A 4/2015
(Continued)

OTHER PUBLICATIONS

International Search Report dated Feb. 25, 2020 in corresponding application PCT/EP2019/070472.

*Primary Examiner* — Kira Nguyen
(74) *Attorney, Agent, or Firm* — Muncy, Geissler, Olds & Lowe , P.C.

(57) ABSTRACT

A control system for a motor vehicle having a first control unit and having a first power electronics unit connected in a signal-transmitting manner to the first control unit for supplying power to a first actuator in normal operation of the control system. In order to ensure proper operation of a control system for a motor vehicle, even in the event of a fault, the control system has a backup control unit and a backup power electronics unit connected in a signal-transmitting manner to the backup control unit for supplying power to the first actuator in a first backup operation of the control system. The backup control unit is connected to the first control unit in a signal-transmitting manner. The control (Continued)

system is transferred from normal operation to the first backup operation as a function of the arrival in the backup control unit of a fault signal.

10 Claims, 1 Drawing Sheet

(51) Int. Cl.
    *B60W 30/188*     (2012.01)
    *B60W 50/029*     (2012.01)

(52) U.S. Cl.
    CPC ............. *B60W 2050/021* (2013.01); *B60W 2050/0292* (2013.01)

(56) References Cited

U.S. PATENT DOCUMENTS

| | | |
|---|---|---|
| 10,185,315 B2 | 1/2019 | Naoi et al. |
| 10,481,603 B2 | 11/2019 | Pink et al. |
| 2009/0078493 A1* | 3/2009 | Nagase .............. B62D 5/046 180/443 |
| 2014/0049998 A1* | 2/2014 | Casey ................ H02M 7/48 363/97 |
| 2014/0211520 A1* | 7/2014 | Zhang ............... H02M 1/126 363/37 |
| 2018/0159316 A1* | 6/2018 | Aramaki ............ H02M 7/217 |
| 2019/0299944 A1* | 10/2019 | Nilsson ............. B60T 13/741 |

FOREIGN PATENT DOCUMENTS

| | | |
|---|---|---|
| CN | 106573625 A | 4/2017 |
| DE | 102013112169 A1 | 5/2015 |
| DE | 102014212384 A1 | 12/2015 |
| DE | 102015206531 A1 | 1/2016 |
| DE | 102017111449 A1 | 12/2017 |
| DE | 102017206553 A1 | 7/2018 |
| EP | 1219489 A2 | 7/2002 |
| EP | 3113351 A1 | 1/2017 |
| WO | WO2010034739 A1 | 4/2010 |
| WO | WO2014048462 A1 | 4/2014 |

\* cited by examiner

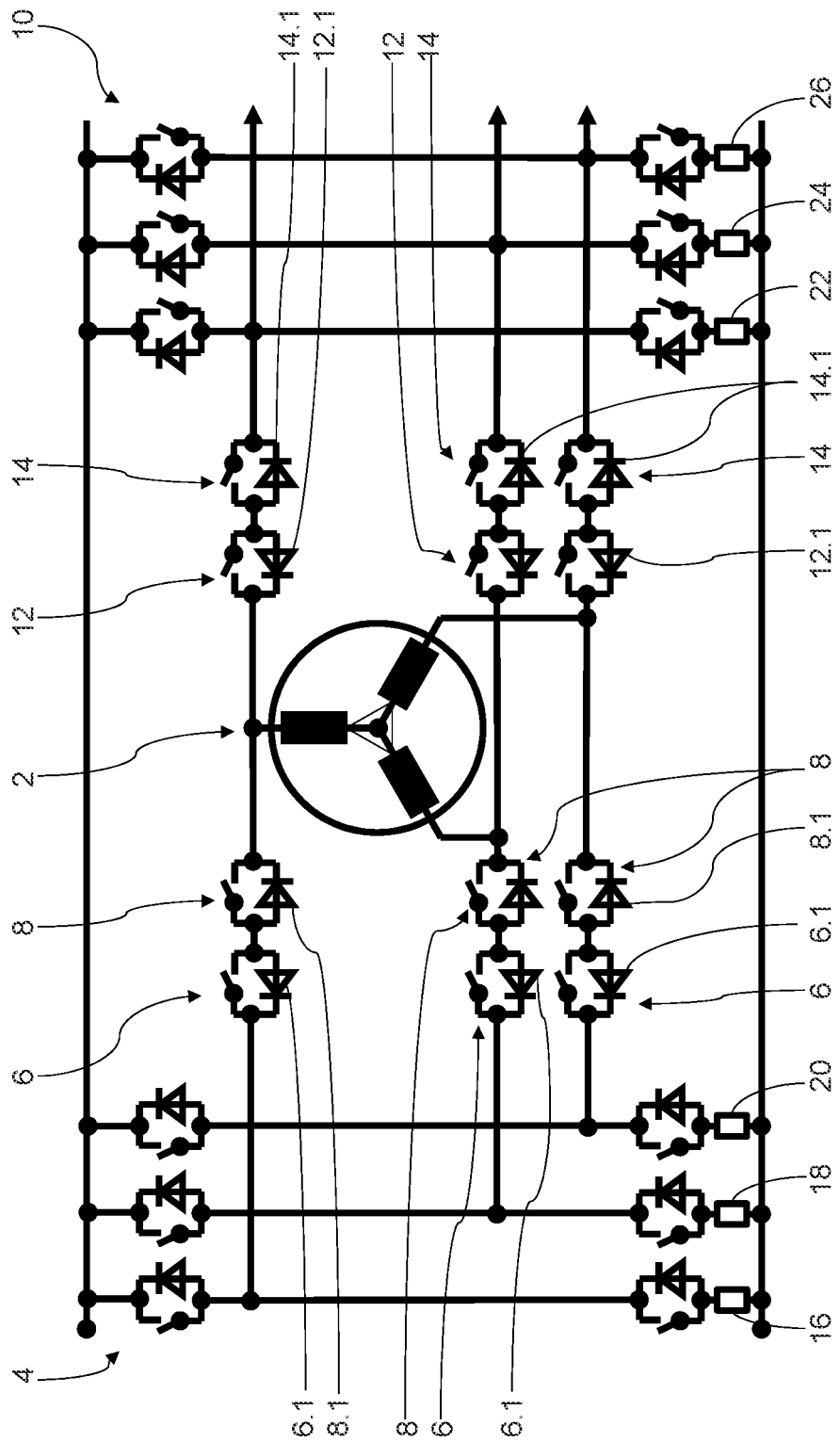

CONTROL SYSTEM FOR A MOTOR VEHICLE AND METHOD FOR DIAGNOSING A FAILURE IN A CONTROL SYSTEM

This nonprovisional application is a continuation of International Application No. PCT/EP2019/070472, which was filed on Jul. 30, 2019 and which claims priority to German Patent Application No. 10 2018 213182.1, which was filed in Germany on Aug. 7, 2018 and which are both herein incorporated by reference.

BACKGROUND OF THE INVENTION

Field of the Invention

The present invention relates to a control system for a motor vehicle and a method for fault diagnosis in a control system.

Description of the Background Art

Such control systems for motor vehicles, having a first control unit and a first power electronics unit connected in a signal-transmitting manner to the first control unit for supplying power to a first actuator in normal operation of the control system, and methods for fault diagnosis in such control systems are already known in numerous design versions from the prior art.

SUMMARY OF THE INVENTION

It is therefore an object of the present invention to ensure proper operation of a control system for a motor vehicle, even in the event of a fault.

This object is attained by a control system for a motor vehicle according to which the control system has a backup control unit and a backup power electronics unit connected in a signal-transmitting manner to the backup control unit for supplying power to the first actuator in a first backup operation of the control system, wherein the backup control unit is connected to the first control unit in a signal-transmitting manner and the control system can be transferred from normal operation to the first backup operation as a function of the arrival in the backup control unit of a fault signal from the first control unit, wherein the first power electronics unit can be galvanically isolated from the first actuator by means of at least one first disconnect switch per phase of the first power electronics unit and the backup power electronics unit can be galvanically connected to the first actuator by means of at least one first connecting switch per phase of the backup power electronics unit.

In addition, the object is attained by a method for fault diagnosis in a control system for a motor vehicle and the method has the following steps: measurement of the current flowing in the relevant phase by means of the corresponding measurement resistor in such a manner that the functionality of each individual switch is determined, and in the event of a malfunction of one of the switches in the first power electronics unit, the first actuator is galvanically isolated from the first power electronics unit by means of the at least one first disconnect switch, or in the event of a malfunction of one of the switches in the second power electronics unit, the second actuator is galvanically isolated from the second power electronics unit by means of the at least one second disconnect switch, and the actuator corresponding to the faulty power electronics unit is galvanically connected to the backup power electronics unit by means of the at least one connecting switch corresponding to this actuator. The dependent claims relate to advantageous improvements of the invention.

An important advantage of the invention is, in particular, that proper operation of a control system for a motor vehicle is ensured even in the event of a fault. In the event of a fault in the first control unit or the first power electronics unit, the first power electronics unit can be galvanically isolated from the first actuator by means of the at least one first disconnect switch per phase, and the first actuator can be galvanically connected to the backup power electronics unit by means of the at least one first connecting switch per phase, so that the first actuator, and thus the function of the motor vehicle carried out by means of the first actuator, can be controlled by means of the backup control unit.

An especially advantageous improvement of the control system according to the invention provides that the control system has a second control unit and a second power electronics unit connected in a signal-transmitting manner to the second control unit for supplying power to a second actuator in normal operation of the control system, and the backup control unit is connected to the second control unit in a signal-transmitting manner for supplying power to the second actuator in a second backup operation of the control system, wherein the control system can be transferred from normal operation to the second backup operation as a function of the arrival in the backup control unit of a fault signal from the second control unit, wherein the second power electronics unit can be galvanically isolated from the second actuator by means of at least one second disconnect switch per phase of the second power electronics unit and the backup power electronics unit can be galvanically connected to the second actuator by means of at least one second connecting switch per phase of the backup power electronics unit. As a result, it is possible to ensure proper operation of a control system for a motor vehicle for two different actuators, and thus for two different functions of the motor vehicle, with little additional effort, even in the event of a fault.

In addition to the functioning of the applicable control unit for driving its corresponding actuator, it is also necessary for proper operation of the control system according to the invention that the switches of the power electronics unit associated with the control unit are functioning properly. Accordingly, the method according to the invention for fault diagnosis in a control system for controlling a first actuator or a first and a second actuator of a motor vehicle provides the following steps: measurement of the current flowing in the relevant phase by means of the corresponding measurement resistor, in such a manner that the functionality of each individual switch is determined, and in the event of a malfunction of one of the switches in the first power electronics unit, the first actuator is galvanically isolated from the first power electronics unit by means of the at least one first disconnect switch, or in the event of a malfunction of one of the switches in the second power electronics unit, the second actuator is galvanically isolated from the second power electronics unit by means of the at least one second disconnect switch, and the actuator corresponding to the faulty power electronics unit is galvanically connected to the backup power electronics unit by means of the at least one connecting switch corresponding to this actuator.

It is ensured in this way that, in the event of a malfunction of one of the switches in the first power electronics unit or—if present—the second power electronics unit, the actuator corresponding to the power electronics unit with the faulty switch is reliably isolated from this power electronics unit and reliably connected to the backup control unit and to the backup power electronics unit associated with the backup control unit. This is absolutely necessary, because otherwise faulty driving of the actuator corresponding to the faulty power electronics unit by means of the backup power electronics unit can occur.

In addition, it is crucial for the functioning of the backup control unit with the backup power electronics unit that the connection of the backup power electronics unit to the actuator affected by the fault functions properly in the event of a fault in the aforementioned power electronics unit. Thus, it is important that the at least one connecting switch per phase that corresponds to the actuator affected by the fault, which is necessary for the connection, likewise functions properly. Accordingly, an advantageous improvement of the method according to the invention provides that, in the event of a malfunction of one of the switches in the backup power electronics unit, the first actuator is galvanically isolated from the backup power electronics unit by means of the at least one first connecting switch, or the first actuator and the second actuator are galvanically isolated therefrom by means of the at least one first connecting switch and by means of the at least one second connecting switch. It is ensured by this means that a connection of the backup power electronics unit to the affected actuator does not take place in the event of a faulty connecting switch.

Fundamentally, the at least one first disconnect switch and/or the at least one second disconnect switch and/or the at least one first connecting switch and/or the at least one second connecting switch can be freely chosen within broad suitable limits in terms of type, mode of operation, dimensioning, arrangement, and number. An advantageous improvement of the control system according to the invention provides that the at least one first disconnect switch and/or the at least one second disconnect switch and/or the at least one first connecting switch and/or the at least one second connecting switch are/is implemented as a semiconductor switch. Semiconductor switches can be obtained in a variety of designs, and thus can be used for a multiplicity of different applications. Moreover, semiconductor switches are economical and space-saving.

An especially advantageous improvement of the aforementioned embodiment of the control system according to the invention provides that the at least one first disconnect switch per phase of the first power electronics unit and/or the at least one second disconnect switch per phase of the second power electronics unit and/or the at least one first connecting switch per phase of the backup power electronics unit and/or the at least one second connecting switch per phase of the backup power electronics unit are/is implemented as two series-connected MOSFET switches, wherein the body diodes of the relevant series-connected MOSFET switches have mutually opposing reverse directions. MOSFET switches have fast responses and have only a low internal resistance. Because of the aforementioned connection of the MOSFET switches arranged in series, namely such that the body diodes of the relevant series-connected MOSFET switches have mutually opposing reverse directions, galvanic isolation of the relevant phase of the associated power electronics unit or of the associated backup power electronics unit is ensured.

Accordingly, an especially advantageous improvement of the method according to the invention provides that in each phase of the first power electronics unit and of the backup power electronics unit, or in each phase of the first power electronics unit, of the second power electronics unit, and of the backup power electronics unit, two first disconnect switches and two first connecting switches, or two first disconnect switches, two second disconnect switches, two first connecting switches, and two second connecting switches are connected in series in each case, and in the event of a malfunction of one of the first disconnect switches or second disconnect switches or first connecting switches or second connecting switches, the actuator corresponding to the faulty disconnect switch or connecting switch is galvanically isolated from the power electronics unit or backup power electronics unit associated with the faulty disconnect switch or connecting switch by means of the other disconnect switch or connecting switch corresponding to the faulty disconnect switch or connecting switch.

Another especially advantageous improvement of the control system according to the invention provides that the first power electronics unit and the backup power electronics unit, or the first power electronics unit, the second power electronics unit, and the backup power electronics unit have a measurement resistor per phase for measuring the current flowing in the phase in question. In this way, a fault diagnosis of the switches arranged in each phase, which is to say including the disconnect switches and the connecting switches, is simple to realize in terms of circuitry. For example, such measurement resistors are already present in the power electronic units available on the market. No additional measurement resistors or measurement devices, for example in a structural and circuit unit with the applicable individual switches, are required.

An additional advantageous improvement of the method according to the invention provides that the current for the measurement with the relevant measurement resistor has a sufficiently low value that an output of the first actuator and/or an output of the second actuator essentially is not moved. It is ensured by this means that the first and/or second actuator and the function of the motor vehicle performed therewith are not actuated in an unwanted way when the measurement is carried out.

Another advantageous improvement of the method according to the invention provides that the measurement of the current flowing in each phase is carried out as a function of an operating state and/or of a state of motion of the motor vehicle. For example, it is possible that the measurement is automatically carried out only when the ignition of the motor vehicle is switched off and/or only when the motor vehicle is stopped. On the one hand, it is ensured by this means that the measurement can take place without disturbance from the operation of the motor vehicle and thus from the operation of the first and/or second actuator. On the other hand, an unwanted influencing of the first and/or second actuator, and thus of the operation of the motor vehicle, by the measurement is prevented effectively.

Further scope of applicability of the present invention will become apparent from the detailed description given hereinafter. However, it should be understood that the detailed description and specific examples, while indicating preferred embodiments of the invention, are given by way of illustration only, since various changes, combinations, and modifications within the spirit and scope of the invention will become apparent to those skilled in the art from this detailed description.

BRIEF DESCRIPTION OF THE DRAWING

The present invention will become more fully understood from the detailed description given hereinbelow and the accompanying drawing which are given by way of illustration only, and thus, are not limitive of the present invention, and wherein the sole FIGURE is an exemplary embodiment of a control system according to the invention for a motor vehicle in a partial representation

DETAILED DESCRIPTION

In the FIGURE, an exemplary embodiment of a control system according to the invention for a motor vehicle is shown by way of example. The control system has a first control unit for a first function and a second control unit for a second function of a motor vehicle that is not shown in detail. The first and second control units likewise are not shown. The motor vehicle in this case is implemented as an autonomous vehicle, in which the functions of the motor vehicle are chosen and carried out essentially automatically by the motor vehicle.

The first function is implemented as a braking function and the second function as a steering function of the motor vehicle. Accordingly, the first control unit controls the braking function of the motor vehicle and the second control unit controls the steering function of the motor vehicle. The control system has a first actuator 2 implemented as a brake in order to carry out the braking function and a second actuator (not shown) implemented as a steering system in order to carry out the steering function. The first control unit for controlling the braking function of the motor vehicle has a signal-transmitting connection to a first power electronics unit 4 of the first actuator 2 of the motor vehicle implemented as a brake and the second control unit has a signal-transmitting connection to a second power electronics unit (not shown) of the second actuator of the motor vehicle implemented as a steering system. Even when a first actuator 2 implemented as a brake is discussed in the present exemplary embodiment, it is a matter of course that a multiplicity of brakes can also be involved according to the invention.

So that the braking function and the steering function of the motor vehicle can be carried out properly, and thus reliably/safely, even in the event of a fault of one of the control units, the control system for the motor vehicle additionally has a backup control unit (not shown) in addition to the two control units.

The first power electronics unit 4 in this case is arranged to be spatially separated from the first control unit, the second control unit, and the backup control unit, and forms a modular unit together with the first actuator 2 implemented as a brake. Accordingly, the first power electronics unit 4 is arranged in immediate spatial proximity to the first actuator 2. The first actuator 2 and the second actuator are each implemented as a three-phase motor. The first power electronics unit 4 can be connected in an electrically conductive manner to the first actuator 2 by means of two first disconnect switches 6 and 8 per phase, wherein the first disconnect switches 6, 8 per phase are arranged in series. The first disconnect switches 6, 8 per phase are thus connected in series. The first disconnect switches 6 and 8 here are each implemented as semiconductor switches, namely as MOSFET switches in each case, wherein the body diodes 6.1 and 8.1 of the two first disconnect switches 6, 8 per phase have mutually opposing reverse directions.

Consequently, the first power electronics unit 4 can be isolated reliably, namely galvanically, from the first actuator 2 by means of the first disconnect switches 6, 8 in the event of an emergency condition of the first control unit or of the first power electronics unit. The same applies for a first backup power electronics unit 10 that can be connected or is connected in a signal-transmitting manner to the backup control unit. The backup power electronics unit 10 is likewise part of the aforementioned modular unit, so that this modular unit includes the brake 2, the first power electronics unit 4, and the first backup power electronics unit 10. Accordingly, the first backup power electronics unit 10 is also arranged spatially separated from the backup control unit, and is arranged in immediate spatial proximity to the first actuator 2, namely the brake 2. The first backup power electronics unit 10 can be connected in an electrically conductive manner to the first actuator 2 by means of two first connecting switches 12 and 14 per phase, wherein the first connecting switches 12, 14 per phase are arranged in series. The first connecting switches 12, 14 per phase are thus connected in series. The first connecting switches 12 and 14 are each implemented here as semiconductor switches, namely as MOSFET switches in each case, wherein the body diodes 12.1 and 14.1 of the two first connecting switches 12, 14 per phase have mutually opposing reverse directions. Consequently, the backup power electronics unit 10 can be connected reliably, namely galvanically, to the first actuator 2 by means of the first connecting switches 12, 14 in the event of one of the aforementioned emergency conditions. In an emergency condition of the backup control unit or of the backup power electronics unit 10, the first actuator 2 can be isolated reliably, namely galvanically, from the backup power electronics unit 10 by means of the first connecting switches 12, 14.

Similar applies for the second power electronics unit. The second power electronics unit is likewise arranged to be spatially separated from the first control unit, the second control unit, and the backup control unit, and forms a modular unit together with the second actuator implemented as a steering system. Accordingly, the second power electronics unit is arranged in immediate spatial proximity to the second actuator. The second power electronics unit can be connected in an electrically conductive manner to the second actuator by means of two second disconnect switches per phase. The second disconnect switches are likewise not shown. The second disconnect switches per phase are arranged in series. The second disconnect switches per phase are realized, and arranged relative to the backup power electronics unit 10, analogously to the first disconnect switches 6, 8. The second disconnect switches are thus connected in series and are each implemented as semiconductor switches, namely as MOSFET switches in each case. The body diodes of the two second disconnect switches per phase likewise have mutually opposing reverse directions. The arrangement of the second power electronics unit and the second disconnect switches is thus identical to the arrangement of the first power electronics unit 4 and the first disconnect switches 6, 8 that is evident from FIG. 1. The backup power electronics unit 10, analogously to the first actuator 2, can be connected in an electrically conductive manner to the second actuator by means of two second connecting switches per phase, wherein the second connecting switches are not shown and are arranged in series per phase. The second connecting switches per phase are thus connected in series. The second connecting switches are each implemented here as semiconductor switches, namely as MOSFET switches in each case, wherein the body diodes of the two second connecting switches per phase have mutually opposing reverse directions. The backup power electronics unit 10 can be connected reliably, namely galvanically, to the second actuator by means of the second connecting switches.

Consequently, the second power electronics unit can be isolated reliably, namely galvanically, from the second actuator by means of the second disconnect switches in the event of an emergency condition of the second control unit or of the second power electronics unit, and the second actuator can be connected reliably, namely galvanically, to the backup power electronics unit 10 by means of the second connecting switches. In analogous fashion to the above embodiments, the backup power electronics unit 10 that can be connected or is connected in a signal-transmitting manner to the backup control unit can be isolated reliably, namely galvanically, from the second actuator by means of the second connecting switches in the event of an emergency condition of the backup control unit or of the backup power electronics unit.

In other applications, a different number of actuators could be involved with regard to the braking function and/or the steering function. The person skilled in the art will select and determine the appropriate choice and number of actuators for the specific function of the motor vehicle depending on the individual case.

The specific signal-transmitting connection between the first control unit and the first power electronics unit 4 of the brake 2 as well as the second control unit and the second power electronics unit of the steering system is not shown in FIG. 1. The backup control unit has a signal-transmitting connection to the first and the second control unit on the one hand and at the same time has a signal-transmitting connection to the first backup power electronics unit 10 of the brake 2 and the steering system.

A measurement resistor 16, 18, 20, 22, 24, 26, namely a shunt resistor, is arranged in each phase of the first power electronics unit 4, of the second power electronics unit, and of the backup power electronics unit 10 in order to measure the current flowing in the respective phase. The measurement resistors in each phase of the second power electronics unit are not shown in the FIGURE.

In contrast to the present exemplary embodiment, it is also possible, however, that separate backup power electronics units are provided and used for the first actuator and the second actuator instead of a common backup power electronics unit. For example, the respective backup power electronics unit with the corresponding power electronics unit could then be structurally integrated with the respective actuator.

The brake 2 and the steering system of the motor vehicle are safety-related, and thus very important, functions of the motor vehicle. This applies to an even greater degree for the chosen exemplary embodiment, which is of course an autonomous vehicle.

The method according to the invention is explained in detail below in keeping with the present exemplary embodiment and on the basis of the FIGURE.

In normal operation of the control system according to the invention for the autonomous vehicle, the brake 2 is controlled by means of the first control unit for the braking function of the motor vehicle and the steering system is controlled by means of the second control unit for the steering function of the motor vehicle. The necessity of a braking intervention by the first control unit or a steering intervention by the second control unit is decided in the first control unit or in the second control unit or in a control unit at a higher level than the respective control unit in a manner known to the person skilled in the art on the basis of the input signals from sensors of the motor vehicle present at the appropriate control unit. Neither any higher-level control unit nor the sensors of the motor vehicle are shown in the FIGURE.

The backup control unit does not intervene in the braking function or in the steering function of the motor vehicle in the above-described normal operation of the control system according to the invention in accordance with the present exemplary embodiment. In the event of a fault in the first or second control unit, a corresponding fault signal from the faulty control unit is present as an input signal at the backup control unit by means of the signal-transmitting connection that exists between the first control unit and the backup control unit as well as between the latter and the second control unit.

If, for example, the first control unit were to operate faultily so that the brake 2 controlled thereby is no longer controlled properly, and thus the braking function of the motor vehicle is no longer carried out reliably, then this fault is reported to the backup control unit by means of the signal-transmitting connection, whereupon the backup control unit is configured such that it controls the braking function of the motor vehicle; in other words, it controls the function of the motor vehicle corresponding to the faulty first control unit. For this purpose, the backup control unit exchanges signals with the backup power electronics unit 10 of the brake 2 of the motor vehicle by means of the signal-transmitting connection. Thus, in the event of a fault in the first control unit, the brake 2 is no longer controlled by the first control unit, but instead by the backup control unit. The same applies for a fault in the first power electronics unit 4 of the brake 2, which in normal operation is driven, which is to say controlled, by the first control unit.

Similar applies if the second control unit were to operate faultily. In this case, the backup control unit receives a corresponding fault indication regarding the second control unit by means of the signal-transmitting connection, whereupon the backup control unit is configured such that it controls the steering function of the motor vehicle. The steering system is thus no longer controlled by the faulty second control unit, but instead by the backup control unit, specifically by means of the signal-transmitting connection and the backup power electronics unit 10, which is likewise associated with the steering system. The same applies for a fault in the second power electronics unit of the steering system, which in normal operation is driven, which is to say controlled, by the second control unit.

As already explained in the introductory part of the description, it is necessary for proper functioning of the control system according to the invention for controlling the first actuator 2 and the second actuator of the motor vehicle that the switches corresponding to the first actuator 2 and the second actuator, which is to say including the first disconnect switches 6, 8, the second disconnect switches, the first connecting switches 12, 14, and the second connecting switches, function properly.

Accordingly, the method according to the invention in keeping with the present exemplary embodiment provides that the current flowing in the relevant phase is measured by means of the corresponding measurement resistor 16, 18, 20, 22, 24, 26 in such a manner that the functionality of each individual switch is determined, and in the event of a malfunction of one of the switches in the first power electronics unit 4, the first actuator 2 is galvanically isolated from the first power electronics unit 4 by means of the first disconnect switches 6, 8, or in the event of a malfunction of one of the switches in the second power electronics unit, the second actuator is galvanically isolated from the second power electronics unit by means of the second disconnect switches, and the actuator 2 corresponding to the faulty power electronics unit 4 unit is galvanically connected to the backup power electronics unit 10 by means of the connecting switches 12, 14 corresponding to this actuator 2.

Similar applies for the case of a malfunction of one of the switches in the backup power electronics unit 10. In this case, the first actuator 2 is galvanically isolated from the backup power electronics unit 10 by means of the first connecting switches 12, 14, and the second actuator is galvanically isolated by means of the second connecting switches.

In another embodiment, namely that separate backup power electronics units are provided and used for the first actuator and the second actuator instead of a common backup power electronics unit 10, only the actuator corresponding to the faulty backup power electronics unit would accordingly be galvanically isolated by means of the at least one connecting switch associated with this actuator.

A malfunction of one of the first disconnect switches 6, 8 or of one of the second disconnect switches or of one of the first connecting switches 12, 14 or of one of the second connecting switches would likewise be detected by means of the current measurements in each of the phases, and in the event of a malfunction of one of the first disconnect switches 6, 8 or of the second disconnect switches or of the first connecting switches 12, 14 or of the second connecting switches, the actuator 2 corresponding to the faulty disconnect switch 6, 8 or connecting switch 12, 14 would be galvanically isolated from the power electronics unit 4 or backup power electronics unit 10 associated with the faulty disconnect switch 6, 8 or connecting switch 12, 14 by means of the other disconnect switch 6, 8 or connecting switch 12, 14 corresponding to the faulty disconnect switch 6, 8 or connecting switch 12, 14.

In order to ensure that the first and/or second actuator 2 and the function of the motor vehicle carried out therewith, for example the braking function, are not actuated in an unwanted way when the measurement is carried out by means of the measurement resistors 16, 18, 20, 22, 24, 26, the measurement with the relevant measurement resistor 16, 18, 20, 22, 24, 26 is carried out with a sufficiently low current value that an output of the first actuator 2 and an output of the second actuator essentially are not moved.

Furthermore, the measurement of the current flowing in each phase is carried out as a function of an operating state of the motor vehicle. The measurements are automatically carried out only when the ignition of the motor vehicle is switched off. On the one hand, it is ensured by this means that the measurements can take place without disturbance from the operation of the motor vehicle and thus from the operation of the first and/or second actuator 2. On the other hand, an unwanted influencing of the first and/or second actuator 2, and thus of the operation of the motor vehicle, by the measurements is prevented effectively.

A malfunction identified by means of the method according to the invention can be output such that it can be perceived by a user of the motor vehicle or repair shop staff and/or stored in a fault memory for later use, in a manner known to the person skilled in the art.

The invention is not limited to the present exemplary embodiment. For example, it is possible that the control system according to the invention for a motor vehicle is present in a motor vehicle and is deactivated, and can be activated for a future use by means of an operator action by a vehicle driver, by repair shop staff, or the like. Accordingly, provision can be made in other embodiments of the control system according to the invention that the control system has an operator interface and can be transferred from a deactivated state to an activated state as a function of the presence of an activation signal at the operator interface, wherein the backup control unit in the deactivated state of the control system does not control the actuator of the motor vehicle corresponding to the faulty control unit independently of the input of a fault signal, and in the activated state of the control system controls the actuator of the motor vehicle corresponding to the faulty control unit as a function of the input of a fault signal.

Similar applies for the method according to the invention, according to which in another embodiment of the method according to the invention the control system has an operator interface and is transferred from a deactivated state to an activated state as a function of the presence of an activation signal at the operator interface, wherein the backup control unit in the deactivated state of the control system does not control the function of the motor vehicle corresponding to the faulty control unit independently of the input of a fault signal, and in the activated state of the control system controls the function of the motor vehicle corresponding to the faulty control unit as a function of the input of a fault signal.

For example, it can be possible that autonomous vehicles are not yet legally permitted in some countries. In the event of a later change in the legal situation, the motor vehicle prepared in accordance with the invention can then be converted with minimal effort to its activated state for autonomous vehicle operation, and thus for the use of a control system according to the invention and for the use of a method according to the invention for control of the motor vehicle.

Moreover, it would be possible that, in contrast to the exemplary embodiment in normal operation of the control system according to the invention, the backup control unit is simultaneously implemented as a third control unit for control of a third function of the motor vehicle and controls the first or second function of the motor vehicle corresponding to the faulty first or second control unit as a function of the input of the fault signal in addition to or instead of the third function of the motor vehicle.

For example, it would be possible that the backup control unit, as a third control unit in normal operation of the motor vehicle, controls a fairly lower-level function of the motor vehicle. If a fault of the first or second control unit should then occur, then the backup control unit could be configured such that, instead of controlling the lower-level function, in the event of a fault it controls a function that is higher-level relative thereto, namely one of the functions of the motor vehicle controlled by the first or the second control unit. In this case it could be the braking function or the steering function of the motor vehicle, as in the exemplary embodiment. In other implementations of the invention, for example in the case of functions of the motor vehicle on the same level, it would also be possible, however, that the backup control unit controls the function corresponding to the faulty control unit in addition to the function corresponding to the backup control unit in its normal operation.

The specific signal transmission can take place either directly or indirectly, which is to say, for example, through an additional control unit. Furthermore, the signal transmission can be wired and/or wireless.

The invention is not limited to the braking function and steering function of a motor vehicle. The invention can be also used to good advantage for other functions of a motor vehicle.

The invention being thus described, it will be obvious that the same may be varied in many ways. Such variations are not to be regarded as a departure from the spirit and scope of the invention, and all such modifications as would be obvious to one skilled in the art are to be included within the scope of the following claims.

What is claimed is:

1. A control system for a motor vehicle, the control system comprising:
   a first control unit;
   a first power electronics unit connected in a signal-transmitting manner to the first control unit for supplying power to a first actuator in normal operation of the control system;
   a backup control unit; and
   a backup power electronics unit connected in a signal-transmitting manner to the backup control unit for supplying power to the first actuator in a first backup operation of the control system,
   wherein the backup control unit is connected to the first control unit in a signal-transmitting manner,
   wherein the control system is transferred from the normal operation to the first backup operation as a function of the arrival in the backup control unit of a fault signal from the first control unit, and
   wherein in the first back up operation, the first power electronics unit is galvanically isolated from the first actuator via at least one first disconnect switch per phase of the first power electronics unit and the backup power electronics unit is galvanically connected to the first actuator via at least one first connecting switch per phase of the backup power electronics unit.

2. The control system according to claim 1, wherein the control system has a second control unit and a second power electronics unit connected in a signal-transmitting manner to the second control unit for supplying power to a second actuator in the normal operation of the control system, and the backup control unit is connected to the second control unit in a signal-transmitting manner for supplying power to the second actuator in a second backup operation of the control system, wherein the control system is transferred from the normal operation to the second backup operation as a function of the arrival in the backup control unit of a fault signal from the second control unit, wherein in the second back up operation, the second power electronics unit is galvanically isolated from the second actuator via at least one second disconnect switch per phase of the second power electronics unit and the backup power electronics unit is galvanically connected to the second actuator via at least one second connecting switch per phase of the backup power electronics unit.

3. The control system according to claim 2, wherein the at least one first disconnect switch and/or the at least one second disconnect switch and/or the at least one first connecting switch and/or the at least one second connecting switch are/is implemented as a semiconductor switch.

4. The control system according to claim 3, wherein the at least one first disconnect switch per phase of the first power electronics unit and/or the at least one second disconnect switch per phase of the second power electronics unit and/or the at least one first connecting switch per phase of the backup power electronics unit and/or the at least one second connecting switch per phase of the backup power electronics unit are/is implemented as two series-connected MOSFET switches, wherein body diodes of the relevant series-connected MOSFET switches have mutually opposing reverse directions.

5. The control system according to claim 1, wherein the first power electronics unit and the backup power electronics unit or the first power electronics unit, the second power electronics unit, and the backup power electronics unit have a measurement resistor per phase for measuring the current flowing in the phase in question.

6. A method for fault diagnosis in a control system for controlling a first actuator or a first and a second actuator of a motor vehicle, wherein the control system is the control system according to claim 5, the method comprising:
   measuring the current flowing in the relevant phase via the corresponding measurement resistor such that a functionality of each individual switch is determined; and
   galvanically isolating, in an event of a malfunction of one of the switches in the first power electronics unit, the first actuator from the first power electronics unit via the at least one first disconnect switch, or in the event of a malfunction of one of the switches in the second power electronics unit, galvanically isolating the second actuator from the second power electronics unit via the at least one second disconnect switch and the actuator corresponding to the faulty power electronics unit is galvanically connected to the backup power electronics unit via the at least one connecting switch corresponding to this actuator.

7. The method according to claim 6, wherein, in the event of a malfunction of one of the switches in the backup power electronics unit, the first actuator is galvanically isolated from the backup power electronics unit via the at least one first connecting switch, or the first actuator and the second actuator are galvanically isolated therefrom via the at least one first connecting switch and via the at least one second connecting switch.

8. The method according to claim 6, wherein, in each phase of the first power electronics unit and of the backup power electronics unit or in each phase of the first power electronics unit of the second power electronics unit, and of the backup power electronics unit, two first disconnect switches and two first connecting switches, or two first disconnect switches, two second disconnect switches, two first connecting switches and two second connecting switches are connected in series in each case, and in the event of a malfunction of one of the first disconnect switches or second disconnect switches or first connecting switches or second connecting switches, the actuator corresponding to the faulty disconnect switch or connecting switch is galvanically isolated from the power electronics unit or backup power electronics unit associated with the faulty disconnect switch or connecting switch via the other disconnect switch or connecting switch corresponding to the faulty disconnect switch or connecting switch.

9. The method according to claim 6, wherein the current for the measurement with the relevant measurement resistor has a sufficiently low value that an output of the first actuator and/or an output of the second actuator essentially is not moved.

10. The method according to claim 6, wherein the measurement of the current flowing in each phase is carried out as a function of an operating state and/or of a state of motion of the motor vehicle.

* * * * *